United States Patent
Grace et al.

(10) Patent No.: US 11,247,550 B2
(45) Date of Patent: Feb. 15, 2022

(54) BATTERY PACK MOUNTING SYSTEM AND MOUNTING METHOD

(71) Applicant: Ford Global Technologies, LLC, Dearborn, MI (US)

(72) Inventors: Ihab Grace, Grosse Pointe Woods, MI (US); Shamsuddin A. Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 59 days.

(21) Appl. No.: 16/787,356

(22) Filed: Feb. 11, 2020

(65) Prior Publication Data

US 2021/0245595 A1   Aug. 12, 2021

(51) Int. Cl.
*B60K 1/04*   (2019.01)
*H01M 50/20*   (2021.01)

(52) U.S. Cl.
CPC ............... *B60K 1/04* (2013.01); *H01M 50/20* (2021.01); *B60K 2001/0416* (2013.01); *B60K 2001/0438* (2013.01); *H01M 2220/20* (2013.01)

(58) Field of Classification Search
CPC ........... B60L 50/64; B60L 50/66; B60K 1/04; H01M 50/20
See application file for complete search history.

(56) References Cited

U.S. PATENT DOCUMENTS

| | | | |
|---|---|---|---|
| 4,013,300 A * | 3/1977 | Berger | B60K 15/00 280/834 |
| 8,720,976 B2 | 5/2014 | Oyama et al. | |
| 8,839,895 B2 * | 9/2014 | Kato | H01M 50/20 180/68.5 |
| 9,139,074 B2 | 9/2015 | Jarocki | |
| 9,499,205 B1 | 11/2016 | Elia et al. | |
| 9,505,442 B2 | 11/2016 | Wu et al. | |
| 9,517,686 B1 | 12/2016 | Paramasivam et al. | |
| 10,065,491 B1 | 9/2018 | Syed et al. | |
| 10,272,949 B2 | 4/2019 | Faruque et al. | |
| 10,651,440 B1 * | 5/2020 | Khan | B60L 50/64 |
| 2018/0370467 A1 | 12/2018 | Syed et al. | |
| 2019/0100090 A1 | 4/2019 | Matecki et al. | |

FOREIGN PATENT DOCUMENTS

| | | |
|---|---|---|
| DE | 102012102938 | 10/2013 |
| IN | 201611000882 | 7/2017 |
| JP | 2014180933 | 9/2014 |

* cited by examiner

*Primary Examiner* — Jonathan Ng
*Assistant Examiner* — James J Triggs
(74) *Attorney, Agent, or Firm* — David B. Kelley; Carlson, Gaskey & Olds, P.C.

(57) ABSTRACT

A battery pack mounting system includes, among other things, an outboard bracket connecting a battery pack to a vehicle underbody, a first inboard bracket connecting the battery pack to the vehicle underbody, and a second inboard bracket connecting the battery pack to a tunnel of the vehicle underbody.

17 Claims, 4 Drawing Sheets

BATTERY PACK MOUNTING SYSTEM AND MOUNTING METHOD

TECHNICAL FIELD

This disclosure relates generally to mounting a battery pack to an electrified vehicle.

BACKGROUND

Generally, electrified vehicles differ from conventional motor vehicles because electrified vehicles are selectively driven using one or more battery-powered electric machines. A powertrain for an electrified vehicle can include a high-voltage battery pack having battery cells that store electric power for powering the electric machines and other electrical loads of the electrified vehicle. The battery pack can be secured to an underbody, or another area, of an electrified vehicle.

SUMMARY

A battery pack mounting system according to an exemplary aspect of the present disclosure includes, among other things, an outboard bracket connecting a battery pack to a vehicle underbody, a first inboard bracket connecting the battery pack to the vehicle underbody, and a second inboard bracket connecting the battery pack to a tunnel of the vehicle underbody.

In another example of the foregoing mounting system, the outboard bracket connects the battery pack to a rocker of the vehicle underbody.

In another example of any of the foregoing mounting systems, the outboard bracket includes legs extending from a platform. Along a horizontally facing outboard side of the battery pack, each of the legs is spaced distance from the remaining legs.

In another example of any of the foregoing mounting systems, there are at least four legs.

In another example of any of the foregoing mounting systems, the platform extends along a vertically lower side of the battery pack.

In another example of any of the foregoing mounting systems, the first inboard bracket connects the battery pack to a rail of the vehicle underbody.

In another example of any of the foregoing mounting systems, the rail is a midrail of the vehicle underbody.

In another example of any of the foregoing mounting systems, the first inboard bracket is directly connected to a horizontally facing inboard side of the battery pack and further directly connected to a downwardly facing side of the rail.

In another example of any of the foregoing mounting systems, the second inboard bracket connects the battery pack to a horizontally facing side of the tunnel.

In another example of any of the foregoing mounting systems, the second inboard bracket is directly connected to the tunnel and further directly connected to a vertically lower side of the battery pack.

Another example of any of the foregoing mounting systems includes a driveshaft tunnel.

Another example of any of the foregoing mounting systems includes a mechanical fastener that extends horizontally through an aperture in second inboard bracket to connect the second inboard bracket to the tunnel.

Another example of any of the foregoing mounting systems includes an aft bracket that connects the battery pack to the vehicle underbody.

Another example of any of the foregoing mounting systems a liquid fuel tank on a passenger or driver side of the tunnel. The battery pack is on the other of the passenger or driver side of the tunnel.

A battery pack mounting method according to another exemplary aspect of the present disclosure includes, among other things, connecting a battery pack to a vehicle underbody with an outboard bracket, connecting the battery pack to the vehicle underbody with a first inboard bracket, and connecting the battery pack to a tunnel of the vehicle underbody with a second inboard bracket.

In another example of the foregoing method, the battery pack is disposed on a passenger side or a driver side of the tunnel.

In another example of any of the foregoing methods, a liquid fuel tank is disposed on the other of the passenger side or the driver side of the tunnel.

In another example of any of the foregoing methods, the outboard bracket is connected to the battery pack and a rocker of the vehicle underbody.

In another example of any of the foregoing methods, the connecting of the outboard bracket to the rocker comprises connecting legs of the outboard bracket to the rocker, and further comprises connecting a platform of the outboard bracket to a vertically lower side of the battery pack.

In another example of any of the foregoing methods, the first inboard bracket is connected to the battery pack and a midrail of the vehicle underbody.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a mounting system used to secure a battery pack to an underbody of an electrified vehicle. The mounting system incorporates features that can help to reduce peak forces on the battery pack when a load, such as a side impact load, is applied to the vehicle. The features help to move the battery pack away from the area of impact, while keeping the battery pack secured to the underbody.

Figure 1:
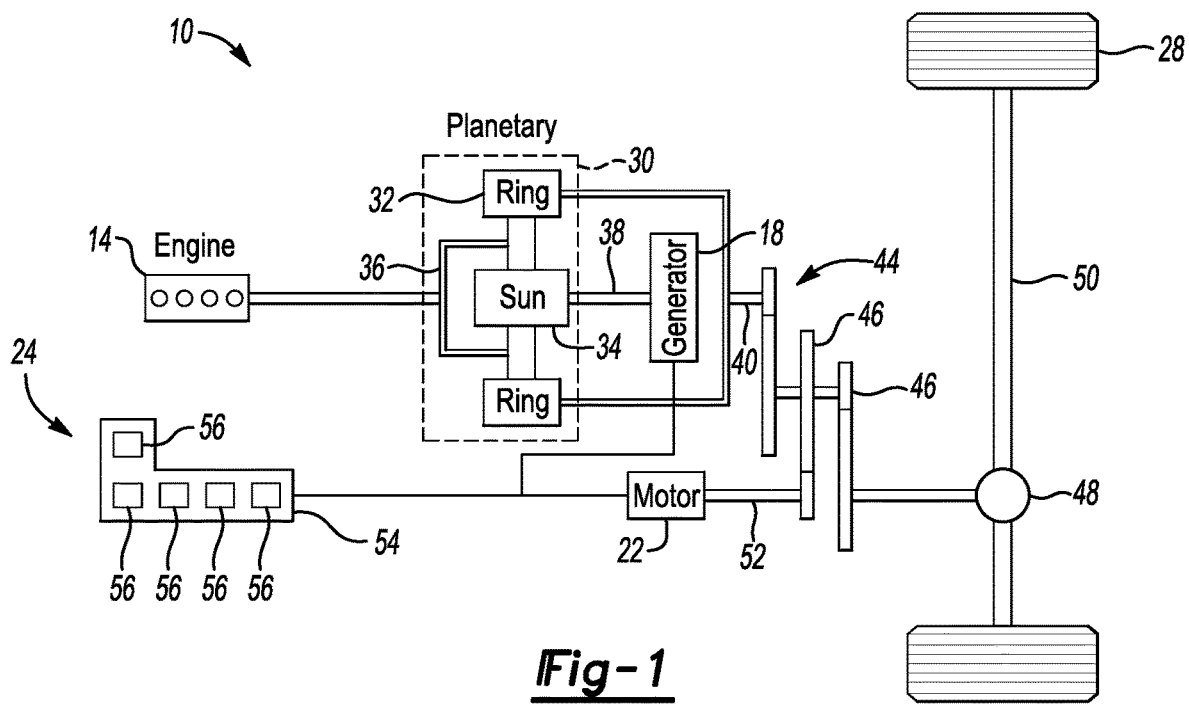
FIG. 1 schematically illustrates an exemplary powertrain of an electrified vehicle.
Figure 2:
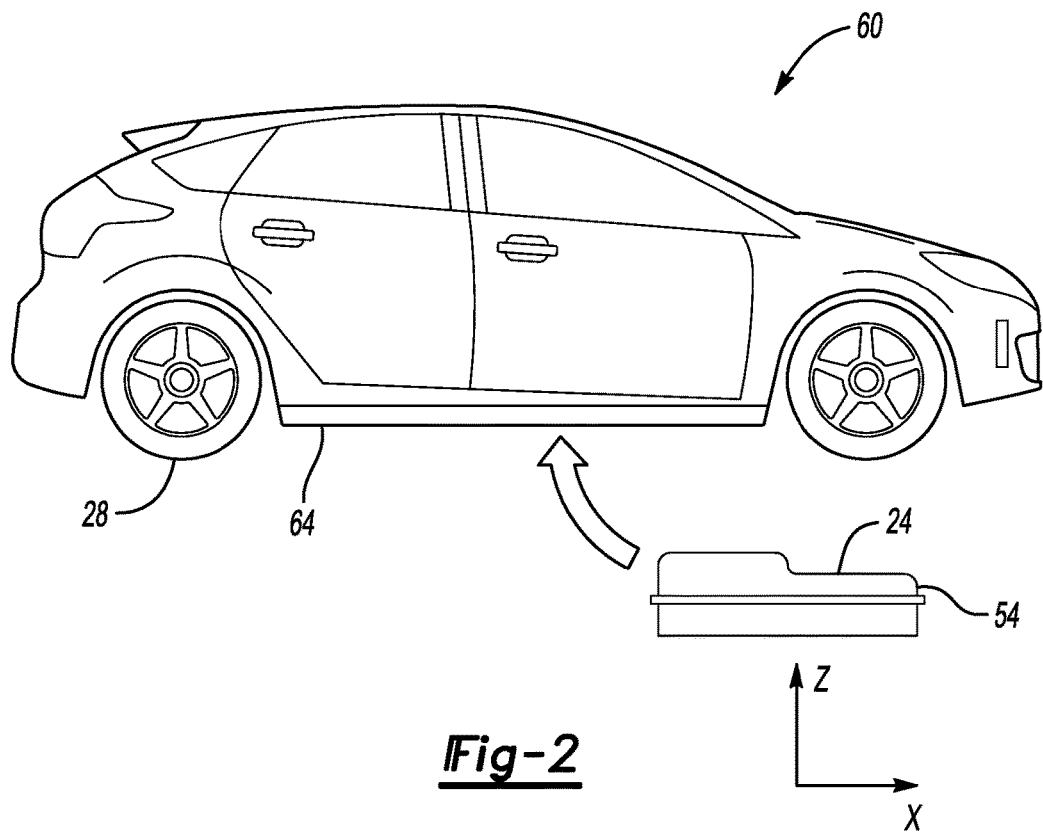
FIG. 2 illustrates a side view of an exemplary electrified vehicle that incorporates the powertrain of FIG. 1 and shows how a battery pack can be secured to a vehicle underbody of the electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles (FCVs), and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and at least one battery pack 24. The first and second drive systems can each generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle battery assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to drive the vehicle drive wheels 28.

In the exemplary embodiment, the battery pack 24 includes an enclosure 54 housing a plurality of battery arrays 56. Each of the battery arrays 56 includes a plurality of individual battery cells.

Referring now to FIGS. 2-5 with continued reference to FIG. 1, an electrified vehicle 60 incorporating the powertrain 10 of FIG. 1 includes the battery pack 24 secured to an underbody 64 of the electrified vehicle 60. The electrified vehicle 60 is an all-wheel drive vehicle having a driveshaft 66 within a tunnel 68 of the underbody 64.

The battery pack 24 is secured to the underbody 64 on a passenger side 70P of the electrified vehicle 60. In another example, the battery pack 24 could be secured to the vehicle underbody 64 on a driver side 70D of the electrified vehicle 60.

In the exemplary embodiment, a mounting system used to secure the battery pack 24 to the vehicle underbody 64 includes four separate mounting brackets that are secured to the enclosure 54 and the underbody 64. The four mounting brackets include an outboard bracket 72, a first inboard bracket 76, a second inboard bracket 80, and an aft bracket 84.

The four mounting brackets can be a metal or metal alloy. The precise material composition of the mounting brackets can be modified to provide a desired behavior when loaded. The material composition could be something other than a metal or metal alloy in some examples.

The enclosure 54 is a metal or metal alloy, but other materials could be used. In a specific embodiment, the mounting brackets of the mounting system are a mild steel material, and the enclosure 54 is a high strength steel.

The outboard bracket 72 attaches the battery pack 24 to a rocker 88 of the vehicle underbody 64. Mechanical fasteners 92 can extend vertically through apertures 96 in the outboard bracket 72 to connect the outboard bracket 72 to the rocker 88.

The outboard bracket 72 includes a plurality of legs 100 that extend vertically upward and outward from a platform 104 of the outboard bracket 72. The apertures 96, in this example, are provided within horizontally extending portions of the legs 100. The outboard bracket 72 includes four individual legs 100 in this example. Other examples could include more than four legs 100, or fewer than four legs 100.

The platform 104 of the outboard bracket 72 extends along a vertically lower side 106 of the enclosure 54 to support the battery pack 24. The platform 104 can be welded to the vertically lower side 106 of the enclosure 54. The platform 104 can include openings 108 that reduce an overall weight of the outboard bracket 72 and can provide clearance to weld components within an interior of the battery pack 24 to the enclosure 54.

Although the exemplary embodiment includes a single outboard bracket, other exemplary systems could use a plurality of outboard brackets.

The first inboard bracket 76 attaches the battery pack 24 to a midrail 110 of the underbody 64. A mechanical fastener 112, such as a bolt, can extend through an aperture 114 of the first inboard bracket 76 to connect the first inboard bracket 76 to a downwardly facing side 116 of the midrail 110.

The first inboard bracket 76 has an inverted "U" profile with the base of the "U" profile providing the aperture 114. Arms extend from the base of the "U" and provide flanges 118 that connect the first inboard bracket 76 to a horizontally facing inboard side 120 of the enclosure 54. In the exemplary embodiment, the flanges 118 are welded to the horizontally facing inboard side 120 of the enclosure 54.

The second inboard bracket 80 is disposed aft of the first inboard bracket 76. The second inboard bracket 80 attaches the battery pack 24 to a tunnel 68 of the vehicle underbody 64. Within the underbody 64, the tunnel 68 provides an area that houses the driveshaft 66 of the electrified vehicle 60. The battery pack 24 is outboard the tunnel 68 on the passenger side 70P. A fuel tank 130 is on the driver side 70D of the underbody 64 and is also outboard the tunnel 68. The fuel tank 130 can hold liquid fuel that is used by the engine 14.

The second inboard bracket 80 is attached to a horizontally facing side 152 of the tunnel 68. The horizontally facing side 152 faces the driveshaft 66 in this example. The second inboard bracket 80 is secured to the vertically lower side 106 of the enclosure 54.

To attach the second inboard bracket 80 to the tunnel 68, mechanical fasteners can extend horizontally through apertures 156 in a vertically extending flange 160 of the second inboard bracket 80. The vertically extending flange 160 is connected to a platform 164 of the second inboard bracket 80 by an angled portion 168 of the second inboard bracket. The platform 164 of the second inboard bracket 80 extends along the vertically lower side 106 of the enclosure 54 to support the battery pack 24. The platform 164 can include openings 172 that reduce an overall weight of the second inboard bracket 80 and can provide clearance to weld components within an interior of the battery pack 24 to the enclosure 54.

The aft bracket 84 is disposed at an aft end of the battery pack 24. In the exemplary embodiment, the aft bracket 84 includes a single arm 180 extending vertically and aftward from a platform 184. The arm 180 includes a flange 188 providing an aperture 192. A mechanical fastener 196, such as a bolt, can extend through the aperture 192 to attach the aft bracket 84 to the underbody 64. The platform 184 of the aft bracket 84 can be welded, for example, to the vertically lower side 106 of the enclosure 54 to attach the aft bracket 84 to the enclosure 54.

Other exemplary embodiments of the mounting system, could use other numbers of brackets to secure the battery pack 24 to the underbody, and the brackets could be disposed at different positions.

Further, although the exemplary mounting system secures the battery pack 24 of the powertrain 10, which has a powersplit configuration, the mounting system could secure a battery pack of another type of electrified vehicle powertrain. For example, the mounting system could be used to secure a battery pack of a Modular Hybrid Transmission (MHT) powertrain. MHTs can have a single electric machine and a step transmission. Thus, the mounting system should not be considered limited to securing the battery pack 24 of a powertrain having powersplit configurations.

The outboard bracket 72, the first inboard bracket 76, the second inboard bracket 80, and the aft bracket 84, among other things, help the battery pack 24 absorb an impact load while maintaining a connection of the battery pack 24 to the vehicle underbody 64. The features can further help to direct movements of the battery pack 24 relative to the vehicle underbody 64 when an impact load is applied to the electrified vehicle 60, particularly an impact load resulting from a side impact.

An example load resulting from a side impact can be a load applied to the passenger side of the electrified vehicle 60 during a side pole impact. A person having skill in this art and the benefit of this disclosure could understand a side pole impact and the testing procedures associated therewith. In side impact tests, the battery pack 24 can be required to maintain a connection to the electrified vehicle 60.

Figure 3:
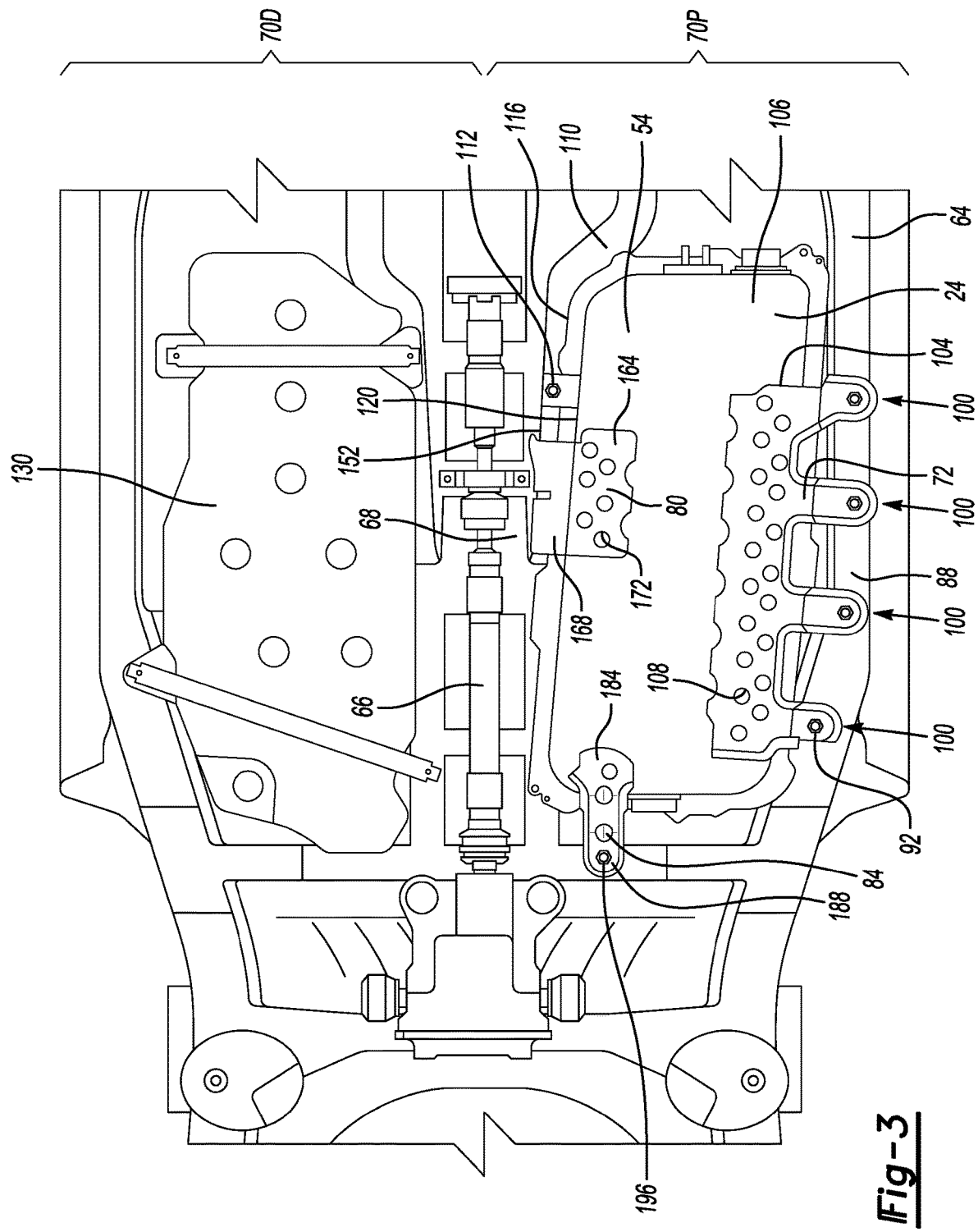
FIG. 3 illustrates a bottom view of the electrified vehicle of FIG. 2 showing a mounting system securing a battery pack to the vehicle underbody of the electrified vehicle.
Figure 4:
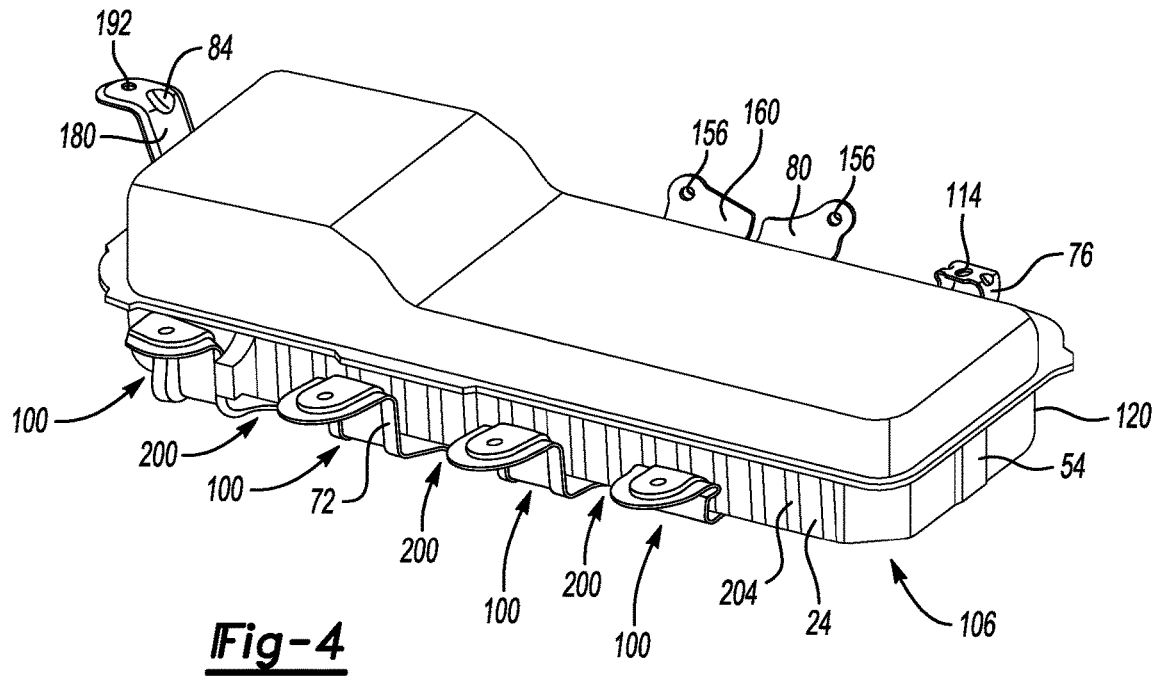
FIG. 4 illustrates a perspective top, outboard view of the battery pack and the mounting system.
Figure 6:
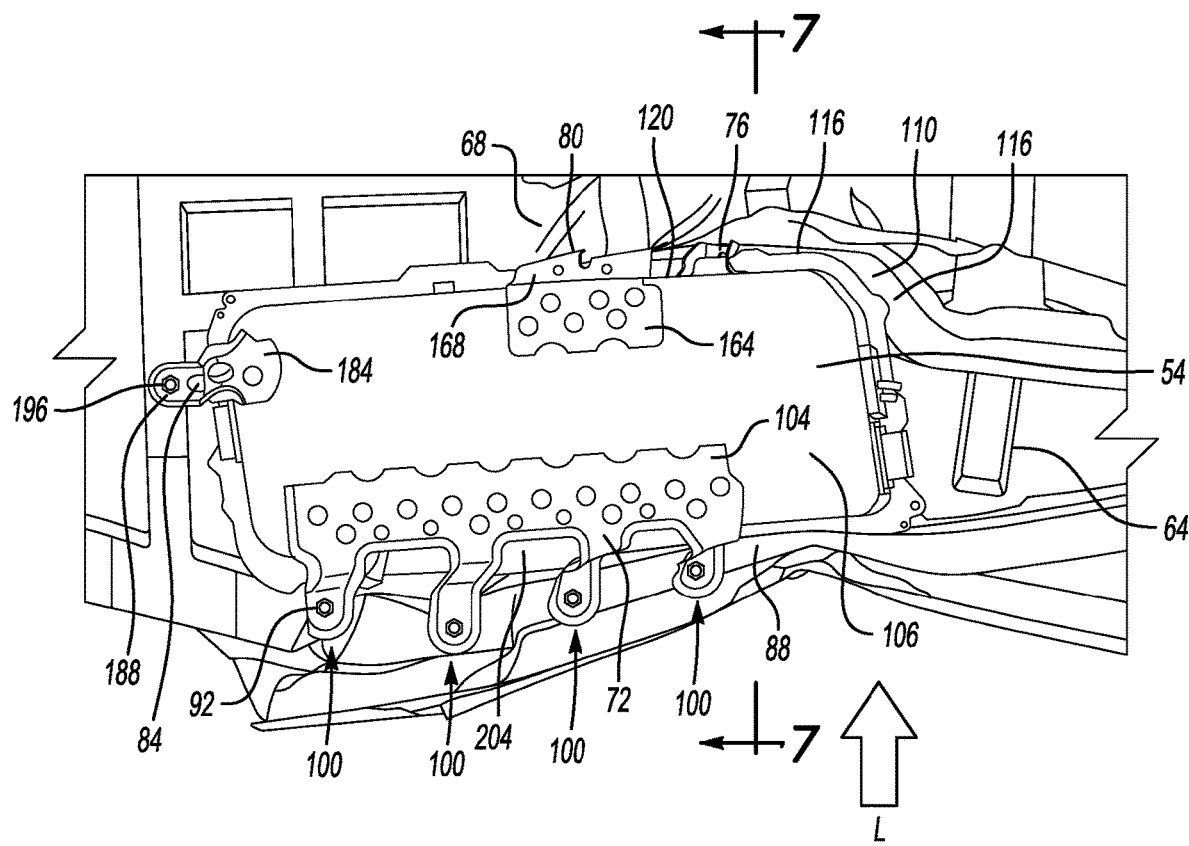
FIG. 6 illustrates the bottom view shown in FIG. 3 after an impact load has been applied to the vehicle.
Figure 7:
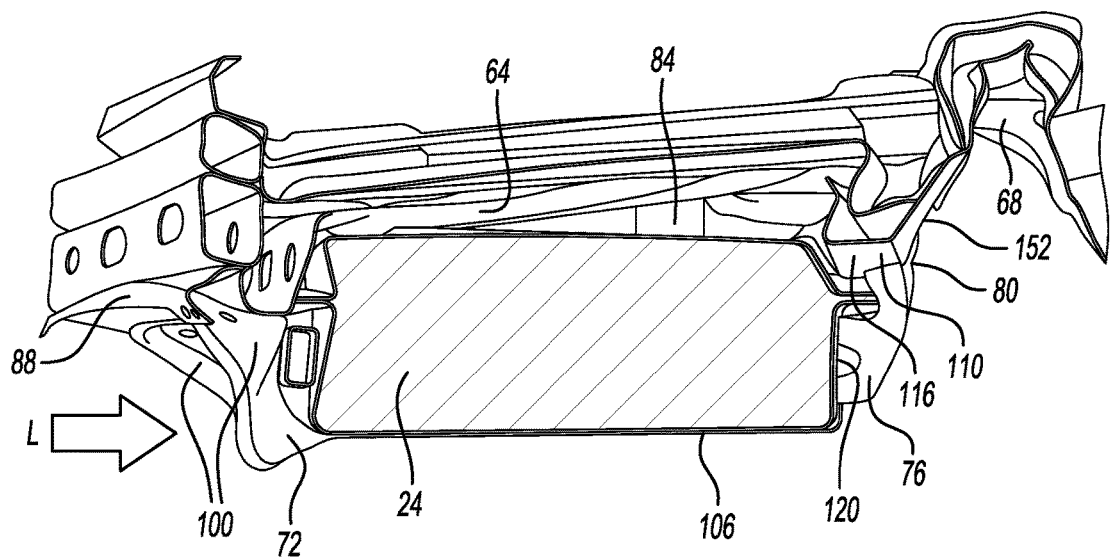
FIG. 7 illustrates a section view taken at line 7-7 in FIG. 6.

FIG. 3 shows the battery pack 24 prior to a load being directed into the passenger side of the electrified vehicle 60. FIGS. 6 and 7 shows the battery pack 24 after a load L has been directed into the driver side of the electrified vehicle 60.

Figure 5:
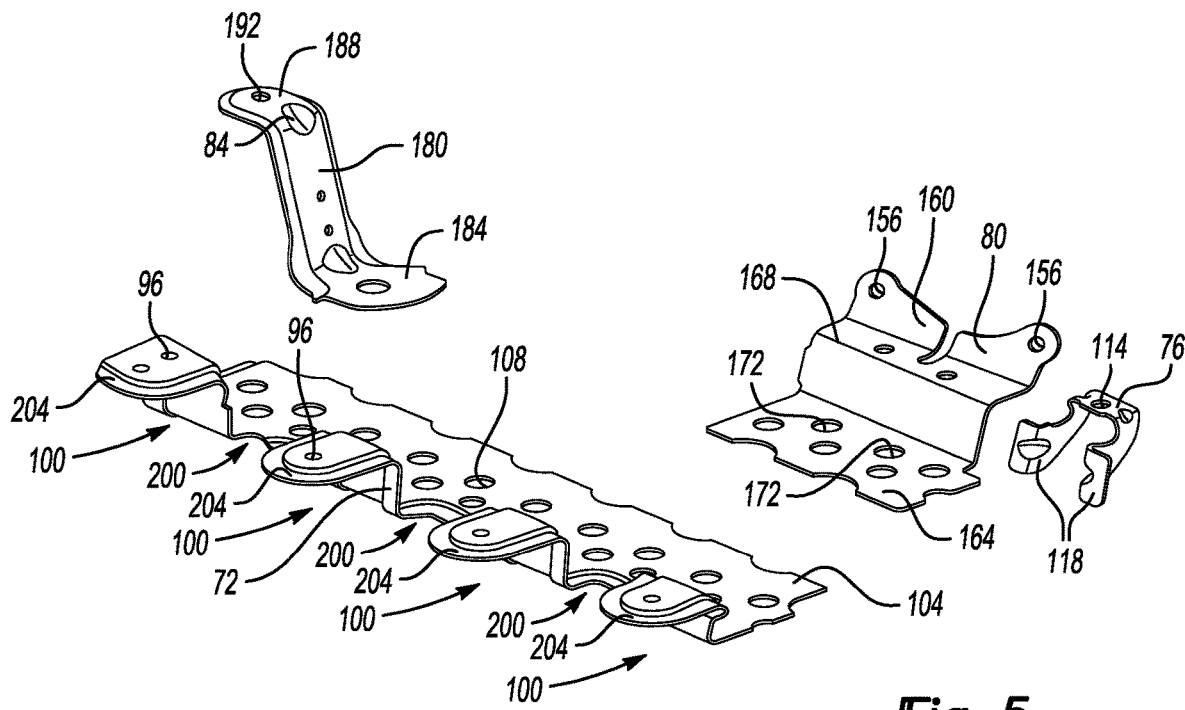
FIG. 5 illustrates a plurality of brackets of the mounting system of FIGS. 3-5.

As the load L is initially directed inward toward a centerline of the electrified vehicle 60, the legs 100 of the outboard bracket 72 comply and adapt to deformation in the area of the rocker 88. The legs 100 facilitate keeping the battery pack 24 connected to the rocker 88 as the rocker 88 deforms in response to the load L. The legs 100 are separated along the longitudinal axis of the vehicle by gaps 200 (FIG. 5). The separation of the legs 100 facilitates the flexing and deformation of the individual legs 100 to the deformation in the area of the rocker 88. In the exemplary embodiment, along a horizontally facing outboard side of the battery pack 204, the individual legs 100 are completely separated from each other.

The legs 100, in the exemplary embodiment, include perimeter flanges 204. The perimeter flanges 204 help to strengthen and stiffen the individual legs 100. The perimeter flanges 204 can help to prevent the legs 100 from fracturing in response to the load L.

The load L moves through the outboard bracket 72 and the underbody 64 and causes the battery pack 24 to shift inward toward the tunnel 68 away from the area of impact. The first inboard bracket 76 resists this initial inward movement, which encourages flexing of the outboard bracket 72 and particularly the legs 100 of the outboard bracket 72.

Eventually, after sufficient loading and movement of the battery pack 24, the first inboard bracket 76 may move and fracture such that the first inboard bracket 76 no longer attaches the battery pack 24 to the midrail 110. The second inboard bracket 80, due to its attachment to the tunnel 68 rather than the midrail 110, keeps the battery pack 24 secured to the underbody 64 if the first inboard bracket 76 is fractured in this way. The second inboard bracket 80 can maintain the battery pack 24 in its attached position due to, among other things, the second inboard bracket 80 being attached to the tunnel 68 rather than the midrail 110. The tunnel 68 tends to move with the battery pack 24 in response to the load L more than the midrail 110, which is a relatively stiffer component of the underbody 64.

The aft bracket 84, as the load L is applied, helps to keep the battery pack 24 from tipping vertically. That is, the aft bracket 84 helps to keep an aft end portion of the battery pack 24 from moving vertically upward or downward relative to a forward end portion of the battery pack 24 when the load L is applied. Limiting the tilting can help to keep the battery pack 24 spaced from the vehicle underbody 64 as the load L is applied.

Features of some of the disclosed examples include a mounting system having brackets that secure a battery pack to a vehicle underbody where the brackets facilitate desired kinematics of the battery pack in response to an impact load. The system can provide a highly flexible attachment system that permits movement of the battery pack away from an impact zone. The legs of, particularly the outboard bracket, can facilitate compliance of the bracket when an impact load is applied and limit crack propagation when the impact load is applied. Accordingly, the use of the legs can help keep the battery pack attached to a vehicle underbody when the load is applied. The first and second inboard brackets can be relatively rigid and move with the battery pack as the impact load shifts the battery pack inward toward a centerline of the vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack mounting system, comprising:
   an outboard bracket connecting a battery pack to a vehicle underbody;
   a first inboard bracket connecting the battery pack to the vehicle underbody; and
   a second inboard bracket connecting the battery pack to a tunnel of the vehicle underbody,
   wherein the first inboard bracket connects the battery pack to a midrail of the vehicle underbody.

2. The battery pack mounting system of claim 1, wherein the outboard bracket connects the battery pack to a rocker of the vehicle underbody.

3. A battery pack mounting system, comprising:
   an outboard bracket connecting a battery pack to a vehicle underbody;
   a first inboard bracket connecting the battery pack to the vehicle underbody; and
   a second inboard bracket connecting the battery pack to a tunnel of the vehicle underbody,
   wherein the outboard bracket connects the battery pack to a rocker of the vehicle underbody,
   wherein the outboard bracket includes a plurality of legs extending from a platform, wherein, along a horizontally facing outboard side of the battery pack, each of the legs within the plurality of legs is spaced a distance from the remaining legs within plurality of legs.

4. The battery pack mounting system of claim 3, wherein the plurality of legs includes at least four legs.

5. The battery pack mounting system of claim 3, wherein the platform extends along a vertically lower side of the battery pack.

6. The battery pack mounting system of claim 1, wherein the first inboard bracket is directly connected to a horizontally facing inboard side of the battery pack and further directly connected to a downwardly facing side of the midrail.

7. The battery pack mounting system of claim 1, wherein the second inboard bracket connects the battery pack to a horizontally facing side of the tunnel.

8. The battery pack mounting system of claim 7, wherein the second inboard bracket is directly connected to the tunnel and further directly connected to a vertically lower side of the battery pack.

9. The battery pack mounting system of claim 7, wherein the tunnel is a driveshaft tunnel.

10. The battery pack mounting system of claim 1, further comprising at least one mechanical fastener that extends horizontally through an aperture in second inboard bracket to connect the second inboard bracket to the tunnel.

11. The battery pack mounting system of claim 1, further comprising an aft bracket that connects the battery pack to the vehicle underbody.

12. The battery pack mounting system of claim 1, further comprising a liquid fuel tank on a passenger or driver side of the tunnel, the battery pack on the other of the passenger or driver side of the tunnel.

13. A battery pack mounting method, comprising:
    connecting a battery pack to a vehicle underbody with an outboard bracket;
    connecting the battery pack to the vehicle underbody with a first inboard bracket; and connecting the battery pack to a tunnel of the vehicle underbody with a second inboard bracket,
    wherein the first inboard bracket is connected to the battery pack and a midrail of the vehicle underbody.

14. The battery pack mounting method of claim 13, wherein the battery pack is disposed on a passenger side or a driver side of the tunnel.

15. The battery pack mounting method of claim 14, wherein a liquid fuel tank is disposed on the other of the passenger side or the driver side of the tunnel.

16. The battery pack mounting method of claim 13, wherein the outboard bracket is connected to the battery pack and a rocker of the vehicle underbody.

17. The battery pack mounting method of claim 16, wherein the connecting of the outboard bracket to the rocker comprises connecting a plurality of legs of the outboard bracket to the rocker, and further comprises connecting a platform of the outboard bracket to a vertically lower side of the battery pack.

* * * * *